W. J. ANDERSON.
AUTOMATIC ELECTRIC BROODER.
APPLICATION FILED APR. 5, 1920.
1,402,335.
Patented Jan. 3, 1922.
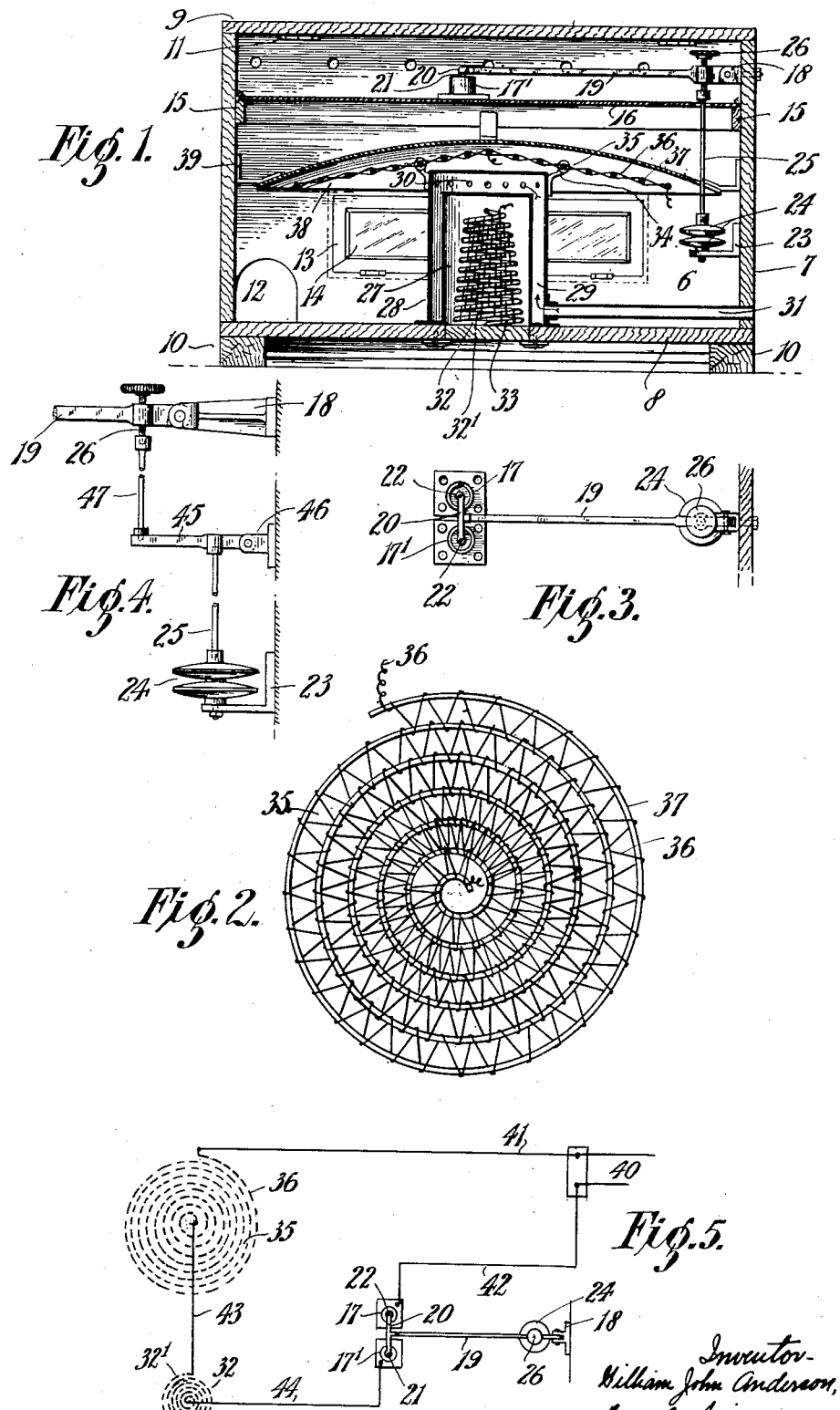

UNITED STATES PATENT OFFICE.

WILLIAM J. ANDERSON, OF CAULFIELD, NEAR MELBOURNE, VICTORIA, AUSTRALIA.

AUTOMATIC ELECTRIC BROODER.

1,402,335.   Specification of Letters Patent.   Patented Jan. 3, 1922.

Application filed April 5, 1920.   Serial No. 371,376.

*To all whom it may concern:*

Be it known that I, WILLIAM JOHN ANDERSON, a subject of the King of Great Britain, residing at Caulfield, near Melbourne, in the State of Victoria, Commonwealth of Australia, have invented new and useful Improvements in Automatic Electric Brooders, of which the following is a specification.

This invention relates to an improved electrically heated brooder embodying improved constructional features, improved heating elements and an air circulation system. Means are also provided to automatically maintain a predetermined temperature in the brooder, thereby obviating the necessity of giving contant attention to the brooder to ensure correct temperature.

An object of the invention is to provide an electrically heated brooder having a heating element of the resistance type interposed in a main circuit, and means which are controlled by the rise and fall of temperature within said brooder, for automatically opening and closing the main circuit.

A further object of the invention is to provide means for the introduction of fresh air into the brooder, for the warming of air so introduced and to circulate the warmed air through the brooder.

Reference is made to the accompanying drawings illustrating the invention.

Figure 1 is a transverse sectional view of the improved brooder.

Figure 2 is a plan view of a heating element detached from the brooder shown in Figure 1.

Figure 3 is a plan view of portion of the brooder.

Figure 4 is a view in side elevation illustrating a modified means for controlling the temperature of the brooder.

Figure 5 is a view illustrating diagrammatically the electrical wiring connections of the improved brooder.

The numeral 6 designates a brooder having an outer casing 7, a floor 8 and a cover 9 all of wood or other suitable material. The brooder 6 is supported on blocks 10, while the cover 9 is hingedly attached at 11 to the casing 7. An orifice 12 permits of the entrance and exit of chickens, and there is also provided a hingedly attached inspection door 13 having fitted therein a pane 14 of glass or other transparent material. Cleats 15 within the casing 7 support a transverse bearer 16, on which are mounted two mercury cups 17 and 17¹ insulated the one from the other.

Pivotally attached to a bracket 18 mounted on the casing 7 is a control lever 19 having at its inner end an insulated contact bridge 20 carrying contact plugs 21 and 22 adapted to contact with the mercury cups 17 and 17¹ respectively.

Supported on a bracket 23 within the brooder 6 is a double air-tight capsule 24 which expands and contracts according to changes in temperature, thereby moving the lever 19 by means of a connecting rod 25. An adjustment screw 26 is fitted to said lever 19.

Mounted vertically on the floor 8 of the brooder 6 are inner and outer cylindrical members 27 and 28 arranged with an air space 29 between them. In the upper portion of the outer cylindrical member 28 there are a plurality of apertures 30, while an air inlet tube 31 extends from the lower portion of said member 28 through the casing 7, and is open to the atmosphere.

Within said inner cylindrical member 27 there is mounted a heating element 32 consisting of a length of nichrome wire 32¹ wound upon and supported by a frame 33 of insulating material such as fibre or the like, which frame is coiled into a conical formation as is shown in Figure 1 of the drawings.

Supported on brackets 34 secured to said cylindrical member 28 is a hooded heating element 35 consisting of a length of nichrome wire 36 wound upon and supported by a frame 37 of insulating material, such as fibre or the like, which is formed into the concave scroll formation illustrated in Figures 1 and 2.

Mounted above said heating element 35 is a heat deflecting hood 38 secured to the casing 7 by means of brackets 39. The electrical connections of the circuit to which the brooder 6 is connected are indicated diagrammatically in Figure 5, wherein the numeral 40 designates a main electric circuit from which leads 41 and 42 extend to the wire 36 of the hooded element 35 and to the mercury cup 17, respectively. A lead 43 connects the wire 36 of the hooded element 35 to the wire 32¹ of the element 32 and a lead 44 connects the said wire 32¹ to the mercury cup 17¹.

To set the brooder ready for use the lever 19 is adjusted by means of the screw 26 so that contact is made between the plugs 21 and 22 and the mercury cups 17 and 17¹, respectively, so that the circuit 40 is closed across the bridge 20. When the current is supplied to the circuit, the elements 32 and 35 become heated, thereby warming the interior of the brooder 6 to a required temperature. Should this predetermined temperature be exceeded, the expansion of the capsule 24 causes the lever 19 to rise, thereby breaking contact between the plugs 21 and 22 and the mercury cups 17 and 17¹, whereupon the circuit 40 normally bridged is opened and the elements 32 and 35 become cool. When the temperature of the brooder again falls the capsule contracts and permits the lever 19 to fall and again close the circuit, whereupon said elements 32 and 35 are re-heated. By these means uniform temperature conditions are maintained within the brooder without requiring manual attention.

When the brooder 6 is in use and the current is switched on to said main circuit, an air draught circulation is set up within the brooder by reason of the fact that the warm air within the space 29 rises and flows outwardly from the apertures 30 into the brooder and out through the apertures 30¹ in the casing 7 to the atmosphere. Cold air is thereby induced through the pipe 31 into the space 29, where it in turn becomes warm and rises. This process continues while the brooder is heated, and an efficient circulation of warm fresh air is thus maintained.

In Figure 4 there is illustrated a modified temperature control means, wherein an additional pivoted lever 45 is mounted in a bracket 46 on the casing 7. This lever is connected to the adjusting screw 26 on the lever 19 by means of a rod 47 and to the capsule 24 by means of the rod 25 thereby forming a compound leverage.

What I do claim is:—

1. A brooder having an electrical heating element of the resistance type, means for supplying current to said element from a main circuit, means controlled by the rise and fall of temperature in the brooder for automatically opening and closing said main circuit, means for admitting atmospheric air to the brooder, and an electrical heating element of the resistance type also in the main circuit for warming the air so admitted.

2. A brooder having a scroll of insulating material, a resistance wire supported by said scroll, a conical spiral of insulating material, a resistance wire supported by said spiral and electrically connected to the resistance wire on said scroll, means for supplying electrical energy to said resistance wires from a main circuit, and a thermal device in said brooder for automatically opening and closing said circuit.

In testimony whereof I affix my signature in presence of two witnesses.

WILLIAM J. ANDERSON.

Witnesses:
JUNE BYRNES,
JAMES H. ANDERSON.